United States Patent
Chalabi et al.

(10) Patent No.: US 10,334,364 B2
(45) Date of Patent: *Jun. 25, 2019

(54) TRANSDUCER CONTROL BASED ON POSITION OF AN APPARATUS

(71) Applicant: Microsoft Technology Licensing, LLC, Redmond, WA (US)

(72) Inventors: Malek Mohamad Nafez Chalabi, Seattle, WA (US); Gary T. McCoy, Oakland, CA (US); Vikram Khandpur, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,092

(22) Filed: Apr. 11, 2018

(65) Prior Publication Data

US 2018/0234767 A1    Aug. 16, 2018

Related U.S. Application Data

(63) Continuation of application No. 15/331,550, filed on Oct. 21, 2016, now Pat. No. 10,015,594.

(Continued)

(51) Int. Cl.
*G06F 1/16* (2006.01)
*H02J 7/00* (2006.01)
(Continued)

(52) U.S. Cl.
CPC ............. *H04R 3/12* (2013.01); *G06F 1/1632* (2013.01); *H04M 1/0245* (2013.01); *H04M 1/04* (2013.01);
(Continued)

(58) Field of Classification Search
CPC .... H04R 3/12; H04R 29/001; H04R 2420/09; H04R 2430/01; H04R 2499/11
See application file for complete search history.

(56) References Cited

U.S. PATENT DOCUMENTS

| | | |
|---|---|---|
| 5,535,093 A | 7/1996 | Noguchi et al. |
| 5,604,663 A | 2/1997 | Shin et al. |

(Continued)

FOREIGN PATENT DOCUMENTS

| | | |
|---|---|---|
| EP | 2559225 A2 | 2/2013 |
| WO | 2016085050 A1 | 6/2016 |

OTHER PUBLICATIONS

"Controlling Accessories and Settings with Smart Connect", Retrieved From: https://support.sonymobile.com/global-en/xperiam5/userguide/smart-connect/#gref, Retrieved Date: Jun. 10, 2016, 6 Pages.

(Continued)

*Primary Examiner* — Brenda C Bernardi
(74) *Attorney, Agent, or Firm* — NovoTechIP International PLLC

(57) ABSTRACT

Techniques for transducer control based on position of an apparatus are described. In at least one implementation, the apparatus comprises a peripheral device that can be connected to a user terminal. The apparatus includes a first portion moveably coupled to a second portion such that the first portion and the second portion are positionable at different positions relative to each other. According to one or more implementations, the apparatus includes a transducer (e.g., a speaker, a microphone, and so forth) that can be selectively controlled based on different relative positions of the first portion and the second portion of the apparatus. In at least some implementations, the apparatus can include multiple transducers that can be controlled differently based (Continued)

on different relative positions of the first portion and the second portion of the apparatus.

21 Claims, 6 Drawing Sheets

Related U.S. Application Data

(60) Provisional application No. 62/361,324, filed on Jul. 12, 2016, provisional application No. 62/353,978, filed on Jun. 23, 2016.

(51) Int. Cl.

| | |
|---|---|
| *H04M 1/02* | (2006.01) |
| *H04M 1/04* | (2006.01) |
| *H04M 1/60* | (2006.01) |
| *H04R 3/12* | (2006.01) |
| *H04M 1/253* | (2006.01) |
| *H04M 1/725* | (2006.01) |
| *H04R 29/00* | (2006.01) |

(52) U.S. Cl.
CPC ........ *H04M 1/6033* (2013.01); *H04R 29/001* (2013.01); *H02J 7/0044* (2013.01); *H04M 1/0214* (2013.01); *H04M 1/2535* (2013.01); *H04M 1/72527* (2013.01); *H04R 2420/09* (2013.01); *H04R 2430/01* (2013.01); *H04R 2499/11* (2013.01)

(56) References Cited

U.S. PATENT DOCUMENTS

| | | | |
|---|---|---|---|
| 6,329,904 B1 | 12/2001 | Lamb | |
| 6,931,601 B2 | 8/2005 | Vronay et al. | |
| 7,155,254 B2 | 12/2006 | Pinder | |
| 7,209,124 B2 | 4/2007 | Hunt et al. | |
| 7,564,445 B2 | 7/2009 | Bathiche | |
| 7,719,830 B2 | 5/2010 | Howarth et al. | |
| 7,815,075 B2 | 10/2010 | Simkins | |
| 8,050,441 B2 * | 11/2011 | Tan .................. | H04R 1/025 181/144 |
| 8,223,483 B2 | 7/2012 | Hayashida et al. | |
| 8,805,399 B2 | 8/2014 | Shmunis | |
| 9,225,376 B2 | 12/2015 | Olson | |
| 9,247,399 B2 | 1/2016 | Cavallaro et al. | |
| 9,269,325 B2 | 2/2016 | Ashbrook | |
| 9,949,015 B1 | 4/2018 | Minoo et al. | |
| 2005/0111182 A1 | 5/2005 | Lin et al. | |
| 2005/0185364 A1 | 8/2005 | Bell et al. | |
| 2005/0244025 A1 * | 11/2005 | Schul .................. | H04R 5/02 381/334 |
| 2006/0067547 A1 * | 3/2006 | Le ...................... | H04R 5/02 381/300 |
| 2007/0101039 A1 | 5/2007 | Rutledge et al. | |
| 2008/0005679 A1 | 1/2008 | Rimas-ribikauskas et al. | |
| 2008/0125195 A1 | 5/2008 | Maenpaa | |
| 2008/0304688 A1 | 12/2008 | Kumar | |
| 2009/0064202 A1 | 3/2009 | Lee et al. | |
| 2009/0179789 A1 | 7/2009 | Haughay et al. | |
| 2009/0197641 A1 | 8/2009 | Rofougaran et al. | |
| 2009/0322558 A1 | 12/2009 | Videtich et al. | |
| 2010/0238119 A1 | 9/2010 | Dubrovsky et al. | |
| 2011/0098087 A1 | 4/2011 | Tseng | |
| 2011/0248665 A1 | 10/2011 | Smith et al. | |
| 2012/0054401 A1 | 3/2012 | Cheng | |
| 2012/0203949 A1 | 8/2012 | Benhard et al. | |
| 2013/0058036 A1 * | 3/2013 | Holzer .................. | G06F 1/1632 361/679.44 |
| 2013/0059284 A1 | 3/2013 | Giedgowd et al. | |
| 2013/0171030 A1 | 7/2013 | Ferlic et al. | |
| 2013/0241735 A1 * | 9/2013 | Nylen .................. | H02J 5/005 340/636.1 |
| 2014/0035511 A1 | 2/2014 | Ferber et al. | |
| 2014/0059263 A1 | 2/2014 | Rosenberg et al. | |
| 2014/0073376 A1 | 3/2014 | Noble Nava | |
| 2014/0118923 A1 | 5/2014 | Stanley | |
| 2014/0149870 A1 | 5/2014 | Griffin et al. | |
| 2014/0228074 A1 | 8/2014 | Kulkarni et al. | |
| 2014/0256380 A1 | 9/2014 | Ortega et al. | |
| 2014/0268542 A1 | 9/2014 | Moon | |
| 2015/0061862 A1 | 3/2015 | Lee et al. | |
| 2015/0074543 A1 | 3/2015 | Edwin et al. | |
| 2015/0082282 A1 | 3/2015 | Larsen et al. | |
| 2015/0110324 A1 * | 4/2015 | Feng .................. | H04R 1/028 381/334 |
| 2015/0163339 A1 | 6/2015 | Fenton | |
| 2015/0163743 A1 | 6/2015 | Narasimha et al. | |
| 2015/0265019 A1 | 9/2015 | Niedzwiecki et al. | |
| 2015/0350422 A1 | 12/2015 | Krishnamurthy et al. | |
| 2016/0073435 A1 | 3/2016 | Baron et al. | |
| 2016/0098017 A1 | 4/2016 | Park et al. | |
| 2016/0182740 A1 | 6/2016 | Cheng et al. | |
| 2016/0262694 A1 | 9/2016 | Calcano et al. | |
| 2018/0034494 A1 | 2/2018 | Bacallao et al. | |

OTHER PUBLICATIONS

"Endeavour Portable Mini Speaker", Retrieved From: https://web.archive.org/web/20160207155458/https://www.noelleeming.co.nz/shop/home-entertainment/portable-audio/ipod-docks/endeavour-en808-portable-mini-speaker/prod120944.html, Retrieved Date: Jul. 15, 2016, 4 Pages.

"LG Electronics 60UF7700 60-Inch 4K Ultra HD Smart LED TV (2015 Model)", Retrieved From: https://www.amazon.com/LG-Eiectronics-60UF7700-60-Inch-Ultra/dp/BOOTRQOPSQ/179-3555340-7132866?ie=UTF8&*Version*=1&*entries*=O, Retrieved Date: Sep. 6, 2016, 20 Pages.

"Non Final Office Action Issued in U.S. Appl. No. 15/349,568", dated Jul. 6, 2018, 15 Pages.

"Non Final Office Action Issued in U.S. Appl. No. 15/402,847", dated Oct. 2, 2018, 19 Pages.

Jung, et al., "Peripheral Notification with Customized Embedded Audio Cues", In Proceedings of The 13th International Conference on Auditory Display, Jun. 26, 2007, pp. 221-228.

Muller, et al., "Towards Ambient Notifications", In Proceedings of The 14th IFIP TC13 Conference on Human-Computer Interaction, Sep. 2013, pp. 21-25.

"Final Office Action Issued in U.S. Appl. No. 15/349,568", dated Jan. 14, 2019, 16 Pages.

"Final Office Action Issued in U.S. Appl. No. 15/402,847", dated Apr. 24, 2019, 15 Pages.

* cited by examiner

TRANSDUCER CONTROL BASED ON POSITION OF AN APPARATUS

RELATED APPLICATIONS

This application is a continuation of and claims priority to U.S. patent application Ser. No. 15/331,550 entitled "Peripheral Device Transducer Configuration" and filed Oct. 21, 2016 which in turn claims priority under 35 U.S.C. Section 119(e) to U.S. Provisional Patent Application No. 62/361,324, filed Jul. 12, 2016 and titled "Peripheral Device Transducer Configuration" and to U.S. Provisional Patent Application No. 62/353,978, filed Jun. 23, 2016 and titled "User Input Peripheral", the disclosures of which are incorporated by reference herein in their entirety.

BACKGROUND

One existing type of peripheral for use with a mobile phone is a docking station which acts as a speaker phone when the phone is docked in the docking station. This may operate in conjunction with the native dialler of the phone (e.g. a cellular dialler) or a separate application such as a VoIP application. Either way, when the phone is docked the audio to be transmitted from the near-end user to the far end-user(s) is captured by a microphone in the docking station instead of the phone's internal microphone, and transferred from that microphone though the docking connection to the phone, then on to the far-end user terminal(s). And/or, the audio received from the far-end user terminal(s) is not played out through the phone's internal speaker, but rather is transferred from the phone to the docking station via the docking connection and played out through a speaker in the docking station. The docking station usually also supplies power to the phone during the call and charges its battery. The user can answer and control the call in the normal way by navigating through the graphical user interface presented on the display screen of the phone (nowadays typically a touchscreen).

In order to provide a physical, mechanical and electrical connection with the mobile phone such peripherals comprise an exposed interface plug or connector which is configured to connect to the mobile phone or other user device. To protect such interface plugs or connectors and/or to reduce the size of the peripheral when not being used as a docking station the peripheral may be folded.

SUMMARY

It is identified herein that existing folding peripherals can produce poor quality audio outputs or poorly capture audio signals from the environment. For example, a transducer orientated such that it provides a suitable audio output when the peripheral is open may be partially or completely enclosed and produce a poor or muffled sound output when the peripheral is closed. Similarly, a transducer located on a top surface of a closed peripheral may when the peripheral is opened by located into a surface and thus be muffled and produce poor quality sound.

The same point may be made with respect to microphone transducers which may be located in an optimal orientation when the peripheral is open but are obstructed or located away from the speaker and thus do not capture a noisy audio signal.

It would be desirable to provide a peripheral with good quality transducer performance independent on whether the device is opened or closed.

Techniques for transducer control based on position of an apparatus are described. In at least one implementation, the apparatus comprises a peripheral device that can be connected to a user terminal. The apparatus includes a first portion moveably coupled to a second portion such that the first portion and the second portion are positionable at different positions relative to each other. According to one or more implementations, the apparatus includes a transducer (e.g., a speaker, a microphone, and so forth) that can be selectively controlled based on different relative positions of the first portion and the second portion of the apparatus. In at least some implementations, the apparatus can include multiple transducers that can be controlled differently based on different relative positions of the first portion and the second portion of the apparatus.

According to one aspect disclosed herein, there is provided a peripheral device for use with a user terminal (e.g. phone, tablet or laptop), wherein the peripheral device comprises: a first housing part and a second housing part flexibly coupled together, the peripheral configured to be operated in an open mode wherein the first housing part and the second housing part lie adjacent to each other such that the peripheral forms a stand for the user terminal and a closed mode wherein the first housing part and the second housing part lie facing each other; at least one sensor in the first housing part configured to determine whether the peripheral device is the open mode or the closed mode; at least one transducer directed in a first orientation suitable for operating in a closed mode; at least one further transducer directed in a further orientation suitable for operating in an open mode; and control logic for controlling the at least one transducer and the at least one further transducer based on the at least one sensor determining whether the peripheral device is the open mode or the closed mode.

In such embodiments the transducers may be controlled based on determining whether the peripheral is operating in an open mode and thus operating as a stand for the user terminal or device or in a closed mode where the peripheral is 'folded' into a compact shape.

The at least one transducer may be a speaker transducer directed in the first orientation, and the at least one further transducer may be a further speaker transducer directed in an orientation opposite the first orientation, wherein the control logic is configured to process an audio signal to be output by the speaker transducer and/or the further speaker transducer based on the magnetic sensor determining whether the peripheral device is in the open mode or the closed mode.

In such embodiments the audio signals may be output to the correctly orientated speaker transducer based on determining whether the peripheral is open or closed.

The control logic configured to process an audio signal may be configured to: receive an audio signal to be output; determine a first gain and a further gain based on the sensor determining whether the peripheral device is in the open mode or the closed mode; apply the first gain to the audio signal and output the first gain audio signal to the speaker transducer; and apply the further gain to the audio signal and output the further gain audio signal to the further speaker transducer.

The control logic configured to process an audio signal may be configured to: receive an audio signal to be output; determine a first frequency filter and a further frequency filter based on the sensor determining whether the peripheral device is in the open mode or the closed mode; apply the first frequency filter to the audio signal and output the first filtered audio signal to the speaker transducer; and apply the further frequency filter to the audio signal and output the further filtered audio signal to the further speaker transducer.

The at least one transducer may be a microphone transducer directed in the first orientation, and the at least one further transducer may be a further microphone transducer directed in an orientation opposite the first orientation, wherein the control logic may be configured to process an audio signal received by the microphone transducer and/or the further microphone transducer based on the sensor determining whether the peripheral device is in the open mode or the closed mode.

In such embodiments the 'correct' orientated microphone may be selected based on the orientation of the peripheral.

The control logic configured to process an audio signal may be configured to: receive an audio signal from the microphone transducer and/or the further microphone transducer; determine a first gain and a further gain based on the sensor determining whether the peripheral device is in the open mode or the closed mode; apply the first gain to the audio signal received from the microphone transducer; and apply the further gain to the audio signal received from the further microphone transducer.

The control logic configured to process an audio signal may be configured to: receive an audio signal from the microphone transducer and/or the further microphone transducer; determine a first frequency filter and a further frequency filter based on the sensor determining whether the peripheral device is in the open mode or the closed mode; apply the first frequency filter to the audio signal received from the microphone transducer; and apply the further frequency filter to the audio signal received from the further microphone transducer.

The at least one transducer directed in a first orientation may be configured to be at least partially covered by the first housing part or the second housing part when the first housing part and the second housing part lie facing each other, and wherein the control logic for controlling the at least one transducer and the at least one further transducer based on the at least one sensor determining whether the peripheral device is the open mode or the closed mode is configured to: switch to the at least one further transducer when the at least one sensor determines the peripheral device is in the closed mode; and switch to the at least one transducer when the at least one sensor determines the peripheral device is in the open mode.

The control logic may be configured to thereby control a voice or video call that is conducted over a packet-based network from the user terminal using a communication client application.

The peripheral device may not comprise any display screen.

The control logic may comprise embedded software and an embedded processor arranged to run the embedded software, and wherein the software may be arranged to run on an embedded operating system having no presentation layer.

The peripheral device may take the form of a docking station, wherein at least one of the first housing part and the second may comprise a physical interface which is exposed when the peripheral is in the open mode and the peripheral forms a stand for the user terminal, the physical interface may be arranged to form a connection with the user terminal when the user terminal when docked with the docking station.

The at least one sensor may comprise a magnetic sensor in the first housing part configured to determine the proximity of at least one magnet located in the second housing part.

The at least one magnetic sensor may be located on a rim of the first housing part and the at least one magnet may be located on a rim of the second housing part such that the at least one magnet may be located in proximity to the at least one magnetic sensor when the first housing part and the second housing part are lie adjacent to each other.

The at least one magnetic sensor may be located on a flat side of the first housing part and the at least one magnet may be located on a flat side of the second housing part such that the at least one magnet may be located in proximity to the at least one magnetic sensor when the first housing part and the second housing part are lie facing each other.

One of the first housing part or second housing part may comprise an electrical connector such that where the first housing part and the second housing are in the open mode, the first housing part and the second housing part form the stand and expose the electrical connector for mounting the user device.

The other of the first housing part or second housing part may comprise a recess such that where the first housing part and the second housing are in the closed mode, the first housing part and the second housing part lie facing each other and the electrical connector lies within the recess and is shielded from physical damage.

According to a second aspect there is provided a method comprising: providing a peripheral device for use with a user terminal, the peripheral device comprising: flexibly coupling a first housing part and a second housing part of the peripheral device wherein the peripheral device can be operated in an open mode wherein the first housing part and the second housing part are lie adjacent to each other such that the peripheral forms a stand for the user terminal and a closed mode wherein the first housing part and the second housing part lie facing each other; determining, using at least one sensor in the first housing part, whether the peripheral device is operating in the open mode or the closed mode; providing at least one transducer directed in a first orientation suitable for operating in a closed mode; providing at least one further transducer directed in a further orientation suitable for operating in an open mode; and controlling the at least one transducer and the at least one further transducer based on the at least one sensor determining whether the peripheral device is the open mode or the closed mode.

Providing the at least one transducer may comprise providing a speaker transducer directed in the first orientation, and providing the at least one further transducer may comprise providing a further speaker transducer directed in an orientation opposite the first orientation, wherein controlling the at least one transducer and the at least one further transducer based on the at least one sensor determining whether the peripheral device is the open mode or the closed mode may comprise processing an audio signal to be output by the speaker transducer and/or the further speaker transducer based on the magnetic sensor determining whether the peripheral device is in the open mode or the closed mode.

Processing an audio signal to be output by the speaker transducer and/or the further speaker transducer based on the magnetic sensor determining whether the peripheral device is in the open mode or the closed mode may comprise: receiving an audio signal to be output; determining a first gain and a further gain based on the determining whether the peripheral device is operating in the open mode or the closed mode; applying the first gain to the audio signal and outputting the first gain audio signal to the speaker transducer; and applying the further gain to the audio signal and outputting the further gain audio signal to the further speaker transducer.

Processing the audio signal to be output by the speaker transducer and/or the further speaker transducer based on the magnetic sensor determining whether the peripheral device is in the open mode or the closed mode may comprise: receiving an audio signal to be output; determining a first frequency filter and a further frequency filter based determining whether the peripheral device is in the open mode or the closed mode; applying the first frequency filter to the audio signal and outputting the first filtered audio signal to the speaker transducer; and applying the further frequency filter to the audio signal and outputting the further filtered audio signal to the further speaker transducer.

The at least one transducer may be a microphone transducer directed in the first orientation, and the at least one further transducer may be a further microphone transducer directed in an orientation opposite the first orientation, controlling the at least one transducer and the at least one further transducer based on the determining whether the peripheral device is the open mode or the closed mode may comprise processing an audio signal received by the microphone transducer and/or the further microphone transducer based on the sensor determining whether the peripheral device is in the open mode or the closed mode.

Processing the audio signal may comprise: receiving an audio signal from the microphone transducer and/or the further microphone transducer; determining a first gain and a further gain based on the determining whether the peripheral device is in the open mode or the closed mode; applying the first gain to the audio signal received from the microphone transducer; and applying the further gain to the audio signal received from the further microphone transducer.

Processing the audio signal may be configured to: receiving an audio signal from the microphone transducer and/or the further microphone transducer; determining a first frequency filter and a further frequency filter based on the sensor determining whether the peripheral device is in the open mode or the closed mode; applying the first frequency filter to the audio signal received from the microphone transducer; and applying the further frequency filter to the audio signal received from the further microphone transducer.

The at least one transducer directed in a first orientation may be at least partially covered by the first housing part or the second housing part when the first housing part and the second housing part lie facing each other, and wherein controlling the at least one transducer and the at least one further transducer based on the determining whether the peripheral device is the open mode or the closed mode comprises: switching to the at least one further transducer when determining the peripheral device is in the closed mode; and switching to the at least one transducer when determining the peripheral device is in the open mode.

The method may further comprise controlling a voice or video call that is conducted over a packet-based network from the user terminal using a communication client application.

The method may be executed by embedded software, and wherein the software may be arranged to run on an embedded operating system having no presentation layer.

The method may further comprise providing a physical interface on at least one of the first housing part and the second housing part which is exposed when the peripheral is in the open mode.

The method may comprise forming, using the physical interface, a connection with the user terminal when the user terminal when docked with the peripheral in a docking station form.

Providing the at least one sensor may comprise providing a magnetic sensor in the first housing part configured to determine the proximity of at least one magnet located in the second housing part.

Providing the magnetic sensor may comprise locating the magnetic sensor on a rim of the first housing part, the method may further comprise locating the magnet on a rim of the second housing part such that the at least one magnet may be located in proximity to the at least one magnetic sensor when the first housing part and the second housing part are lie adjacent to each other.

Providing the magnetic sensor may comprise locating the magnetic sensor on a flat side of the first housing part and providing and locating at least one magnet on a flat side of the second housing part such that the at least one magnet may be located in proximity to the at least one magnetic sensor when the first housing part and the second housing part are lie facing each other.

The method may comprise locating an electrical connector on one of the first housing part or second housing part such that where the first housing part and the second housing are in the open mode, the first housing part and the second housing part form the stand and expose the electrical connector for mounting the user device.

The method may comprise locating a recess on the other of the first housing part or second housing part such that where the first housing part and the second housing are in the closed mode, the first housing part and the second housing part lie facing each other and the electrical connector lies within the recess and is shielded from physical damage.

The user terminal may also take a variety of forms, e.g. a smartphone, tablet, laptop or desktop computer.

In embodiments the control logic may comprise embedded software ("firmware") and an embedded processor (comprising one or more processing units) arranged to run the embedded software. In embodiments the software is arranged to run on an embedded operating system having no presentation layer. Preferably the one or more embedded processors are arranged only to run said embedded software and no other application (i.e. the sole purpose of the peripheral device the control of the call and possibly the speakerphone functionality).

Alternatively the control logic may be implemented in dedicated hardware circuitry.

In embodiments the user terminal has a display screen and a user operating system having a presentation layer for rendering a graphical user interface of the communication client application on said display screen. In embodiments the communication client application is an application other than the native dialler of the operating system on the user terminal.

According to a third aspect there is provided a peripheral device for use with a user terminal, the peripheral device comprising: means for flexibly coupling a first housing part and a second housing part of the peripheral device wherein the peripheral device can be operated in an open mode wherein the first housing part and the second housing part are lie adjacent to each other such that the peripheral forms a stand for the user terminal and a closed mode wherein the first housing part and the second housing part lie facing each other; means for determining, using at least one sensor in the first housing part, whether the peripheral device is operating in the open mode or the closed mode; at least one transducer means directed in a first orientation suitable for operating in a closed mode; at least one further transducer means directed in a further orientation suitable for operating in an open mode; and means for controlling the at least one transducer and the at least one further transducer based on the at least one sensor determining whether the peripheral device is the open mode or the closed mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put in effect, reference is made by way of example to the accompanying drawings in which.

DETAILED DESCRIPTION OF EMBODIMENTS

Figure 1:
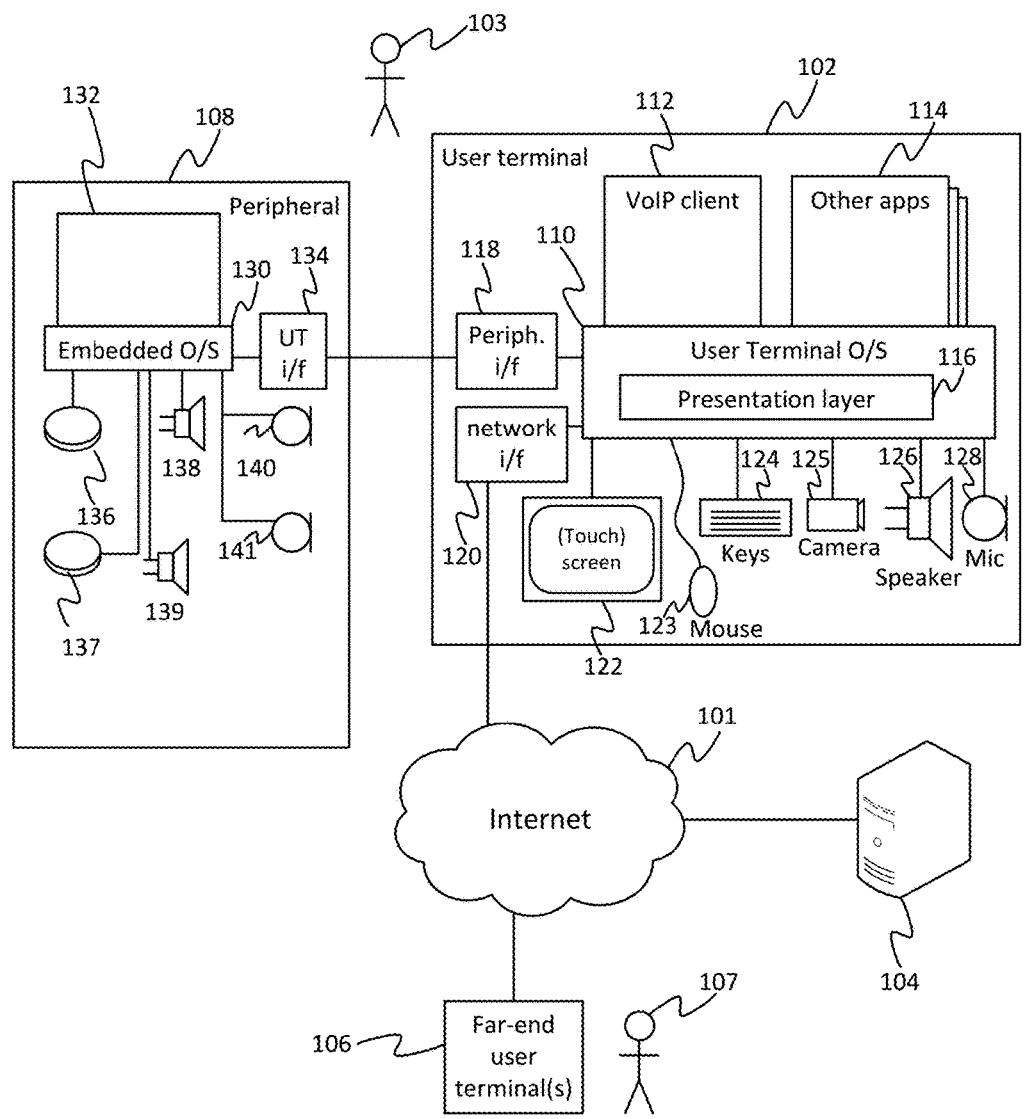
FIG. 1 is a schematic block diagram of a communication system.
Figure 3:
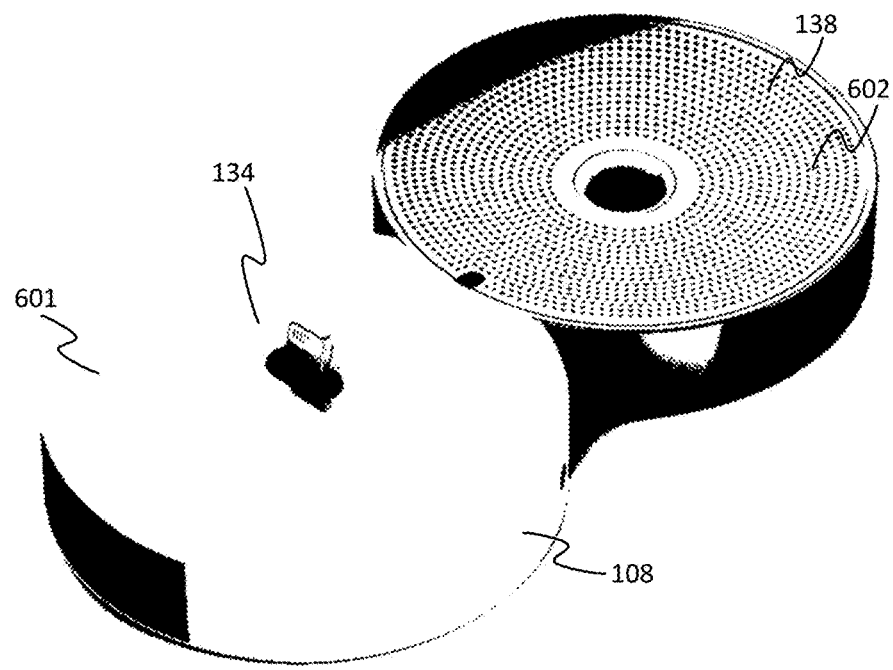
FIG. 3 shows a user terminal docked with a docking station.

FIG. 1 illustrates an example communication system in accordance with embodiments disclosed herein. The system comprises a user terminal 102 such as a mobile phone, tablet, laptop computer or desktop computer; and a peripheral device 108 configured to connect to the user terminal 102. As will be discussed in more detail later, the peripheral 108 takes the form of a docking station. The peripheral device 108 may also be referred to as a hardware accessory in that, while it may in embodiments run embedded firmware, it is a relatively simple device with a dedicated purpose and only a single or a small number of user input controls (e.g. no more than the buttons) and preferably no screen (though in embodiments it is not excluded that the peripheral 108 could have a small screen for some simple or dedicated purpose).

The user terminal 102 comprises an operating system 110, a communication client application 112, and one or more other applications 114 (e.g. in embodiments over one hundred applications, or "apps", and even up to hundred to three hundred applications or more). The operating system 110, communication client 112 and other application(s) 114 are stored on a storage means of the user terminal 102 and arranged to be run (either executed or interpreted) on a processor of the user terminal 102, and to thereby perform the various operations attributed to them herein. The storage on which the operating system 110, communication client application 112 and other application(s) 114 are stored may comprise any one or more storage media implemented in one or more memory units. E.g. the storage means may comprise an electronic storage medium such as an EEPROM (or "flash" memory) and/or a magnetic storage medium such as a hard disk. Note also that the term "processor" as used herein does not exclude that the processor may comprise multiple processing units. The communication client application 112 and other application(s) 114 are each separate applications from one another, individual applications at least in that they are scheduled independently by the operating system 110, and/or can be launched, run and closed independently of one another.

The user terminal 102 also comprises one or more input devices for outputting information to the user 103 and one or more output devices for receiving information from the user 103 (which may be referred to collectively as i/o devices). These include one or more media output devices for outputting audio and visual information from the applications 112, 114 to the user 103, i.e. at least one speaker 126 and a screen 122, respectively. The i/o devices also include one or more media input devices for receiving audio and optionally video information from the user 103, i.e. as a microphone 128 and optionally a camera 125. Furthermore, the i/o devices comprise one or more user input devices enabling the applications 112, 114 to receive user selections from the user 103, such as a mouse or trackpad 123, a set of keys 124 (e.g. a keyboard or keypad), and/or a touchscreen 122 (the screen 122 may or may not be a touchscreen capable of both outputting visual information and receiving inputs form the user 103). The operating system 110 running on the user terminal 102 is an end-user operating system, i.e. designed for user terminals to provide an interface to the end user 103, to present information from applications 112, 114 to a user 103 through a graphical user interface presented on a screen 122, and to receive back inputs to the applications 112, 114 from the user 103 through one or more user input devices 122, 123, 124, 125, 128. As such the user operating system 110 comprises a presentation layer 116. The presentation layer 116 is the layer disposed between the application layer 112, 114 and lower layers (not shown), which formats data from the lower layers to be presented to the application layer 112, 114, and formats data from the application layer 112, 114 to be presented to the lower layers. This includes responsibility for painting graphical user interface on the screen, and receiving inputs from the user selections from the user input devices 122, 124 in relation to the graphical user interface.

Note that each of the i/o devices 122, 123, 124, 125, 126, 128 may be internal or external to the main housing in which the processor running the applications 112, 114 is housed, e.g. as follows. In embodiments the screen 122 may be an integral screen of a smartphone, tablet or laptop or an external screen of a desktop computer. The set of keys 124 may be an integral key set of a smartphone or tablet, an integral keyboard of a laptop or an external keyboard of a desktop computer. The (at least one) speaker 126 may be an internal or external speaker of a smartphone, tablet or laptop, or an external speaker of a desktop computer. The microphone 128 may be an internal or external microphone or a smartphone, tablet or laptop, or an external microphone of a desktop computer. And/or, the camera 125 may be an internal cameral of a smartphone, tablet or laptop, or an external camera connected to a laptop or desktop computer. If used, a mouse 123 is an external device, but this could instead be an integral trackpad or tracker ball of, say, a laptop computer.

The user terminal 102 further comprises a network interface 120 and a peripheral interface 118.

The network interface 120 enables the user terminal 102 to connect to a packet-based network 101 comprising one or more constituent networks. E.g. in embodiments the network 101 may comprises a wide area internetwork such as that commonly referred to as the Internet. Alternatively or additionally, the network 101 may comprise a wireless local area network (WLAN), a wired or wireless private intranet (such as within a company or an academic or state institution), and/or the data channel of a mobile cellular network. To connect to such a network, the network interface 120 may comprise any of a variety of possible wired or wireless means as will be familiar to a person skilled in the art. For example, if the network 101 comprises the Internet, the network interface 120 may comprise a wired modem configured to connect to the Internet via a wired connection such as a PSTN phone socket or cable or fibre line, or via an Ethernet connection and a local wired network. Or alternatively the network interface 120 may comprise a wireless interface for connecting to the Internet via a wireless access point or wireless router and a local (short-range) wireless access technology such as Wi-Fi), or a mobile cellular interface for connecting to the Internet via a mobile cellular network.

The connection to the network 101 via the network interface 120 allows applications 112, 114 running on the user terminal 102 to conduct communications over the network. This includes enabling the communication client application 112 to conduct a voice or video call with another instance of the client application running on a remote user terminal 106, being used by a remote user 107. As a matter of terminology the user terminal 102 from the perspective of which a given communication scenario is being described may be referred to as the near-end terminal, whilst the other, remote user terminal 106 with which the near-end terminal 102 is communicating may be referred to as the far-end terminal (and similarly for the near-end user 103 and far-end user 107 respectively). Not also that the call could in fact be a conference call conducted with multiple remote user terminals and their respective users. By way of illustration the following will be described in terms of a given remote-user terminal 106, but it will be appreciated that the same teachings can be readily extended to multiple remote user terminals in a similar manner.

The communication client 112 on the near-end user terminal 102 is configured so as, when run on the near-end user terminal 102, to receive audio data from the microphone 128 and optionally also video data from the camera 125 and to send this data over the network 101, via the network interface 120, to be played out at the far-end terminal as part of a call conducted between the near-end user 103 and far-end user 107. Further, the communication client 112 is configured so as when run on the user terminal 102 to receive via the network interface audio and optionally video data from the client on the far-end terminal 106 to be played out through the speaker 126 and screen 122, respectively, on the near-end terminal 102.

In embodiments the communication client 112 is a VoIP client configured to conducting the call in the form of a VoIP call (which may also comprise a video element). The VoIP client may optionally also provide additional functionality such as instant messaging (IM). In some embodiments the audio and/or video content of the call may be routed via a server 104 of a provider of a communication service used to conduct the call (where a server as referred to herein may comprise one or more physical server units at one or more geographical sites). Alternatively, some or all of the audio and/or video content of the call may be sent directly over the network 101 between the near-end and far-end user terminals 102, 106, i.e. without being relayed by the server 104. In the latter case the server 104 may nonetheless provide some supporting functions such as: to provide address look up (or this could be done in a P2P fashion); to issue digital authentication certificates by which users 105, 107 may prove their identities to one another; to store respective contact lists of the users 105, 107, being a list of other users the respective user has agreed to accept as contacts for communicating with within the communication service; to store profile information of each user which is viewable by other users within the communication service; and/or to maintain presence information indicating to other users whether the respective user's availability to be communicated with within the communication service.

In embodiments, the communication client application (e.g. VoIP application) 112 may be an application other than the native dialler of the operating system 110, i.e. the default dialler user for telephone calls, which is either one of the other applications 114 or an integrated function of the operating system 110 itself.

Whatever form the client application 112, the call and the communication service take, the communication client application 112 is configured so as when run on the near-end user terminal 102 to present the user with a graphical user interface of the client, enabling the user to control various call-related functions, such as to answer an incoming request to establish the call from the client on the far-end user terminal 106 (if it is an incoming call, i.e. initiated by the far-end user), or to send a call establishment request to the client on the far-end user terminal 106 requesting to establish the call (if it is an outgoing call, i.e. initiated by the near-end user). Other examples of call related functions which the user may control through the GUI of the client 112 include muting the transmitted audio of the call (so the near-end user can't be heard by the far-end user), turning the volume of the received audio up or down, or selecting the fa5-end user 107 from a contact list (to establish the call if it is an outgoing call), or selecting to view profile information of the far-end user 107.

However, when using the GUI of the communication client application 112 on the user terminal 102, the user 103 typically has to follow several steps in order to perform simple tasks. For example, to join a scheduled meeting, they must first find and navigate to an app, launch the app or bring it to the foreground, then navigate to the screen, locate the next meeting and then select the join meeting item. This can be further complicated if the user's mobile device is in a locked state. This inconveniences the user and gets in the way of them using apps like VoIP applications efficiently and frequently.

This issue can be circumvented to some extent using on-screen push notifications, which alert the user 103 to get his or her attention and permit him or her to enter an application within a particular context by selecting the notification on screen. However, the user still has to manually handle the user terminal 102, which is not necessarily desirable, e.g. for a complete hands free experience. For instance, the user still has to approach the user terminal 102 and select a small and potentially fiddly on-screen control to accept the notification.

Another possibility is to connect a hardware accessory (a peripheral 108) to the user terminal 102. The peripheral 108 connects to the user terminal 103 (by either a wireless or wired connection). When the control is activated, it causes a signal or message to be sent to a particular application 112 running on the user terminal 102 which then responds by executing a contextual application function or series of functions.

An example implementation of the peripheral device 108 is illustrated in FIG. 1. As shown, the user terminal 102 comprises a peripheral interface 118, and the peripheral device 108 comprises a user terminal interface 134 for connecting the peripheral 108 to the peripheral interface 118 of the user terminal, thus enabling the peripheral device 108 to control the communication client application 112 running on the user terminal 102. This connection could be any suitable wired or wireless means. For instance, the peripheral interface 118 may comprise a physical port comprising a mechanical connector for forming a wired connection with the user terminal interface 134 on the peripheral device 108 (the user terminal interface 134 on the peripheral 108 comprising the complimentary mechanical connector). E.g. the peripheral interface 118 may comprise a USB port, mini USB port micro USB port, and the user terminal interface 134 may comprise the corresponding USB plug. As another example, the connection may be by any of a variety of wireless means. For instance, the peripheral interface 118 and corresponding user terminal interface 134 may comprise a pair of wireless interfaces arranged to connect together via a local RF technology such as Wi-Fi, Bluetooth, ZigBee or Thread. Note also that in the case where both the peripheral interface 118 and network interface 120 comprise a wireless interface, these may or may not comprise the same physical interface. For example, these may comprise the same physical wireless interface using the same wireless access technology (e.g. Wi-Fi) and simply comprise different logic (e.g. software) for interfacing with the peripheral 108 and network 101 respectively. Alternatively, the peripheral interface 118 and network interface 120 may comprise different physical interfaces arranged to use different wireless access technologies, e.g. the peripheral interface 118 may be a Bluetooth interface whilst the network interface 120 may be a Wi-Fi interface.

The peripheral device 108 comprises control logic 132. The control logic 132 may be in the form of an embedded companion application running on an embedded operating system 130 on the peripheral, to act as a companion to the communication client application 112. Furthermore, the control logic 132 may be in the form of a transducer controller or an audio processing application. The embedded operating system 130 and control logic (companion application and transducer controller application) 132 are stored on a storage means of the peripheral device 108 and arranged to be run (either executed or interpreted) on a processor of the user peripheral device 108, and to thereby perform the various operations attributed to them herein. The storage on which the embedded operating system 130 and control logic 132 are stored may comprise any one or more storage media implemented in one or more memory units. E.g. the storage means may comprise an electronic storage medium such as an EEPROM (or "flash" memory) and/or a magnetic storage medium such as a hard disk. Also, not again that the term "processor" as used herein does not exclude that the processor may comprise multiple processing units.

As an alternative (or in addition) to the control logic (the embedded companion application or transducer controller application) 132, the control logic may be implemented (or partially so) in the form of dedicated hardware circuitry, or configurable or reconfigurable hardware circuitry such as a PGA (programmable gate array) or FPGA (field programmable gate array).

Either way, whether implemented in software, hardware circuitry or a combination of the two, the peripheral 108 may be described as a "hardware accessory" in that it is a simple, low-level peripheral device that cannot be used as a stand-alone user terminal without being connected as a peripheral to a user terminal 102. For example, in embodiments the operating system on the peripheral 108 does not comprise a user operating system designed to provide a graphical user interface to the user 103, but instead comprises an embedded operating system that does not comprise a presentation layer. Furthermore, preferably the peripheral device 108 does not comprise any display screen.

The peripheral device 108 may comprise a first housing part and a further housing part. The first housing part and the further housing parts can be flexibly coupled together. The flexible coupling can enable the relative positioning or location of the first housing part to the further housing part to cause the peripheral device to operate in an open or 'open clam-shell' mode wherein the first housing and the further housing parts lie adjacent to each other. The flexible coupling can also enable the relative positioning or location of the first housing part to the further housing part to cause the peripheral device to operate in a closed or 'closed clam-shell' mode wherein the first housing and the further housing parts lie facing each other. For example, in some embodiments the first and further housing parts are disc like flat cylinders where the height is less than the radius. The housing parts may be flexibly coupled to enable an open 'clam-shell' mode where the two flat cylinders lie such that the rim of the first housing part lies adjacent the rim of the further housing part. In such a configuration at least one face of the first housing or further housing part exposes the physical interface 134. Furthermore, the configuration can create a stable structure for locating the user terminal 102 on when mated with the physical interface and which resists against collapse when the user touches the user terminal 102, for example when providing a user input. The housing parts may furthermore enable a closed 'clam-shell' mode where the two flat cylinders lie such that the faces of the first and further housing part face each other. In such a configuration the other of the at least one face of the first housing or further housing part can comprise a recess configured to contain the interface located on the facing housing part and protects the physical interface 134 from mechanical damage.

In some embodiments there may be more than two stable modes of operation of the peripheral. For example, the peripheral may operate in a partially open or partially closed mode or state.

The peripheral device 108 comprises at least one sensor 136. In some embodiments the sensor 136 takes the form of a magnetic sensor arranged to be actuated by being located close to or touching a magnet 137. The magnetic sensor 136 is located in the first housing part and is configured to determine whether the peripheral device is in the open clam-shell mode or in the closed clam shell mode of operation. This for example may be implemented by locating the magnetic sensor 136 on or towards the rim of the first housing part and furthermore locating at least one magnet 137 on the rim of the further housing part such that the sensor determines when the rims are placed in contact (or proximate) with each other when operated in the open mode. In some embodiments the magnetic sensor 136 is located on the face of the first housing part and magnet 137 located on the face of the further housing part which is in contact with (or proximate to) the face of the first housing part when the peripheral is operated in the closed mode. In some embodiments more than one magnetic sensor and more than one magnet is used in order to determine positively which mode the peripheral is operating in or whether the peripheral is in a mode (which may be a stable or unstable equilibrium mode) between the open and closed modes.

Although the examples described herein show the at least one sensor 136 as a magnetic sensor in some embodiments the sensor may be any suitable sensor. For example, the sensor may be coupled to a biased or retractable flexible coupling between the first and further housing parts which has a first position when the peripheral is operated in an open mode and a second position when the peripheral is operated in a closed mode. In such embodiments the determination of the position of the coupling or the force on the coupling may be used as a sensor input to determine whether the peripheral is in an open or closed mode of operation.

The configuration or arrangement of the magnetic sensors and magnets can be different from the rim and/or face configuration described herein. In some embodiments the magnetic sensor and magnet attract each other in such a manner to bias or stabilise the peripheral in either the open or closed mode.

The control logic (e.g. embedded application) 132 on the peripheral 108 is configured to control a function of the communication client application (e.g. VoIP application) 122 in response to a user 103 input (e.g. in response to the pressing or touching of a button, the detection of motion or the predetermined motion, or the detection of the predetermined voice or other audio command). This control is conducted via the above-described connection between the peripheral 108 and user terminal 102 formed via the peripheral interface 118 on the user terminal 102 and the user terminal interface 134 on the peripheral device 108.

Furthermore, the control logic (e.g. embedded application) 132 on the peripheral 108 is configured such that a function which the user 103 input actuation performs is dependent on a current status of the packet-based call conducted through the communication client application 112—i.e. the current context in which the user input is received. That is, if the near-end user 103 provides an input when the call has a first status, then the input causes the communication client application (e.g. VoIP client) 112 to perform a first function in relation to the call; but if the user performs an identical instance of the (same button press or touch, same motion, or same voice or audio command) at another time when the call has a second, different status, then that instance causes the communication client application 112 to perform a different function to be performed in relation to the call.

For instance, if the call is currently an incoming, unanswered call from corresponding client on the far-end user terminal 106 (i.e. the call is currently a pending call establishment request) then the function of the input may be to answer the call. But if the call is answered and now ongoing (i.e. audio and optionally video media of the call is now being exchanged between the client 112 on the near-end terminal 102 and the corresponding client on the far-end terminal 106, and being played out at the relevant ends) then the input may take on a different function. E.g. this second function may be to mute the transmitted audio of the call, i.e. the near-end user's audio is not sent to the far-end terminal 106. Alternatively, or additionally, if there is currently no incoming or ongoing call, the input may take on another function such as retrieving and playing out the near-end user's voicemail.

In another example, the function of the input may depend on whether there is currently a calendar event scheduled containing an invite to an online meeting via packet-based voice or video call (and/or depending on whether the calendar event scheduled to start within a predetermined time window from the present time). In embodiments, the communication client application 112 either has an in-built calendar function or is configured to access a calendar function of another application 114 running on the near-end user terminal 102 (e.g. the calendar function of an email application, or a dedicated calendar application). As another possibility the communication client 112 may access via the network 101 a calendar function hosted on a server. Wherever implemented, the calendar provides the ability for users and/or applications to schedule calendar events each having a certain specified start time and duration (or equivalently a specified start time and end time). Furthermore, in some cases a calendar event may take the form of a meeting invite containing a link to an online call to be conducted via the network 101 using the communication service (e.g. VoIP service), e.g. a multiparty conference call comprising more than two participants.

In embodiments, the control logic 132 is configured to detect whether there is currently a meeting invite scheduled in the calendar function (i.e. does the present time fall within the), and if so, to invoke the link in the meeting invite in response to the user input, to thereby join the user into the meeting via packet-based voice or video call over the network 101. In variant of this, the user input takes on said function of joining the user into the meeting on condition that the present time falls within a time window consisting of the duration of the meeting and a predetermined time window prior to the meeting. E.g. if there is a meeting scheduled to begin within the next five minutes, actuating the actuator 136 will join the meeting.

If on the other hand there is no meeting currently scheduled according to the calendar function (or no meeting within the next T minutes), then the input takes on a different function, e.g. to listen to voicemail. And/or, if the user is now joined into the meeting, the actuator may have another functions such as muting the call.

In some embodiments the peripheral 108 may additionally be configured to provide the function of a speaker phone, comprising at least one speaker transducer 138 directed in an first orientation and configured to produce an optimal output (or at least be suitable for generating a quality audio output and not be obstructed or covered) when the peripheral is operating in a closed mode and at least one further speaker transducer 139 directed in a further orientation configured to produce an optimal output when the peripheral is operating in an open mode. Furthermore, in some embodiments the peripheral comprises at least one microphone transducer 140 directed in a first orientation and configured to capture an optimal audio signal when the peripheral is operating in a closed mode and at least one further microphone transducer 141 directed in a further orientation configured to capture an optimal audio signal when the peripheral is operating in an open mode.

Thus the peripheral may be configured such that, when connected to the user terminal 102, then one or both of: (a) the received audio of the call from the far-end user 107 can be played out through the speaker 138/139 of the peripheral 108 instead of the speaker 126 of the user terminal 102, and/or the audio of the call captured from the near-end user 103 to be transmitted to be played out to the far-end user 107 is a captured through the microphone 140/141 on the peripheral 108 instead of the microphone 128 of the user terminal 102.

As will now be exemplified with reference to FIGS. 2 to 8, the peripheral device 108 may take any of a variety of different forms. Note that the particular aesthetic design of the user terminal 102 and its GUI shown in FIGS. 3, 4, 5, 7 and 8 is purely an example for illustrative purposes and does not form part of any subject matter to be claimed herein.

In embodiments the user terminal may take the form of a mobile user terminal such as a smartphone, tablet or laptop, and the peripheral device 108 may take the form of a docking station into which the mobile terminal 102 can be docked in order to form said connection between the peripheral interface 118 of the mobile terminal 102 and the user terminal interface 134 of the peripheral 108. The docking station may also be configured to charge a battery of the mobile terminal 102 when so docked.

An example of this is illustrated in FIGS. 2 to 6. In this example the docking station 108 is also arranged to act as a speaker phone (see above) when the user terminal 102 is docked with the docking station 108. FIGS. 2 to 6 show different views of the same example design. As illustrated in FIGS. 2 to 6, the docking station 108 may comprise the first housing part or base segment 601 and the further housing part or cover segment 602, movably connected via the flexible or movable joining element 603 such as a hinge so that the cover segment 602 can be opened to reveal the port 134 for connecting to the user terminal 102 (e.g. this may comprise a mechanical port such as a USB port, mini USB port or micro USB port). Thus when the cover 602 is opened, the user terminal 102 can be docked with the docking station in order to provide the various functionality described herein.

In such embodiments, the user input preferably takes the form of touch sensor element or possibly a mechanical push button input located on the first housing part exposed face which appears outwardly to the user 103 (i.e. aesthetically) to be continuous with the rest of the first housing part surface 601. Preferably this is the only user input control on the exterior of the docking station 108, or at least other than on its underside which is not visible to the user 103 when placed in the intended orientation on a supporting surface such as a table.

In embodiments the first speaker 138 and further speaker 139 may be incorporated in the further housing part 602 while the first microphone 140 and further microphone 141 may be incorporated in the first housing part 601.

In embodiments the docking station 108 may optionally comprise one or more further components, for example one or more lights 608 (e.g. LEDs) which are arranged to provide an indication to the near-end user 103 of a certain predefined state of the communication client application 112 (e.g. VoIP application) or a certain predefined event occurring within the communication service (e.g. VoIP service). As another example the docking station may comprise an additional audio input such as a jack socket, e.g. a 3.5 mm jack socket, allowing the user 103 to plug an audio device other than the mobile terminal 102 (e.g. a dedicated music player) into the docking station and have audio played out from the audio device through the speaker 138/139 of the docking station 108. Further, in embodiments, the control logic 132 (e.g. the embedded memory storing the embedded operating system 130 and companion application/transducer control application) may be mounted on a printed circuit board incorporated inside the first housing part 601.

Figure 7:
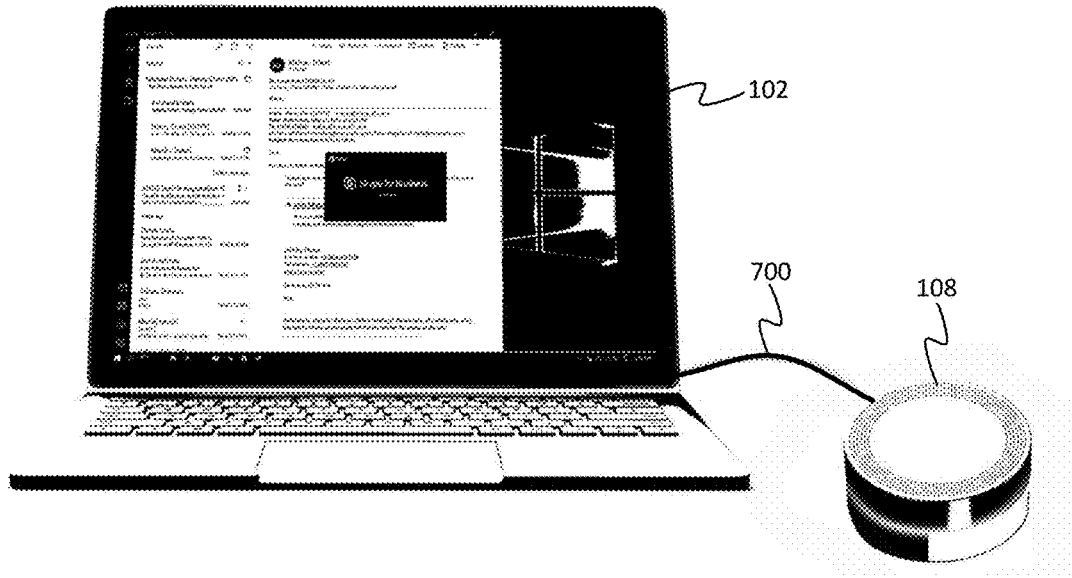
FIG. 7 shows an example of a peripheral connecting to a laptop.
Figure 8:
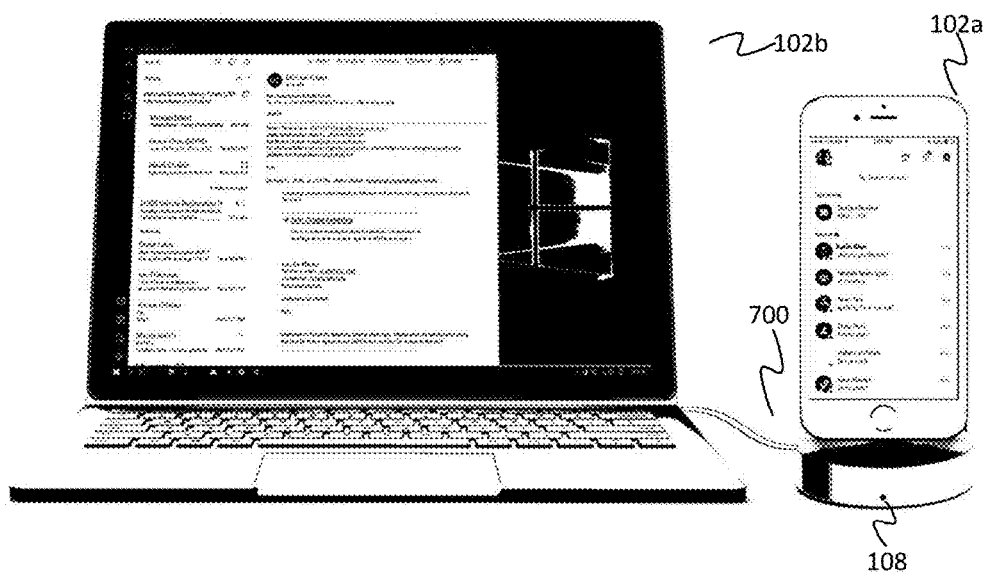
FIG. 8 shows an example of a docking station connected to a laptop.

Referring to FIG. 7, in some embodiments the docking station 108 may further be configured so that it can be connected to another type of user terminal 102 such as a laptop or desktop computer via a cable connection 700 or similarly by a wireless connection such as a Wi-Fi or Bluetooth connection. Or the peripheral 108 may not take the form of a docking station but rather a unit for connecting to a laptop or desktop computer or even a smartphone or tablet via such a wireless or cable connection 700. Either way, the peripheral 108 may be configured such that it can provide any of the above-described functionality via this connection 700, with the laptop, desktop or other device as the user terminal 102. In some embodiments, as shown in FIG. 8, the peripheral 108 may take the form of a docking station 108 that can simultaneously both connect to a larger user terminal such as a laptop or desktop via a wireless or wired connection 700 and also receive a smaller docked mobile user terminal such as a smartphone or tablet into its docking port. In this case the call functionality may be provided via a combination of a first near-side instance of the client application 112 running on the smaller user terminal and a second instance of the client application 112 running on the larger user terminal. In embodiments the control logic 132 on the peripheral can control one or both of them in order to control the relevant function of the call.

Figure 5:
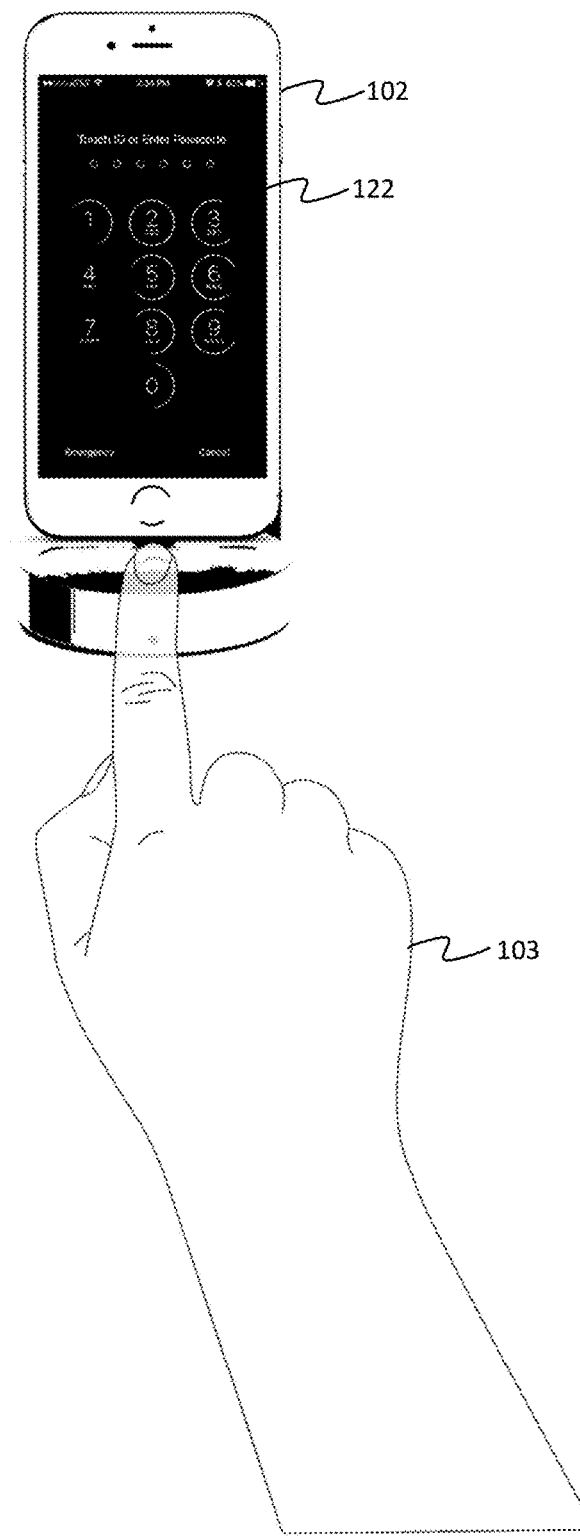
FIG. 5 shows a user pressing a button of a docking station to answer an incoming call, FIG. 6 gives a schematic side and top view diagrams of an example docking station.
Figure 6:
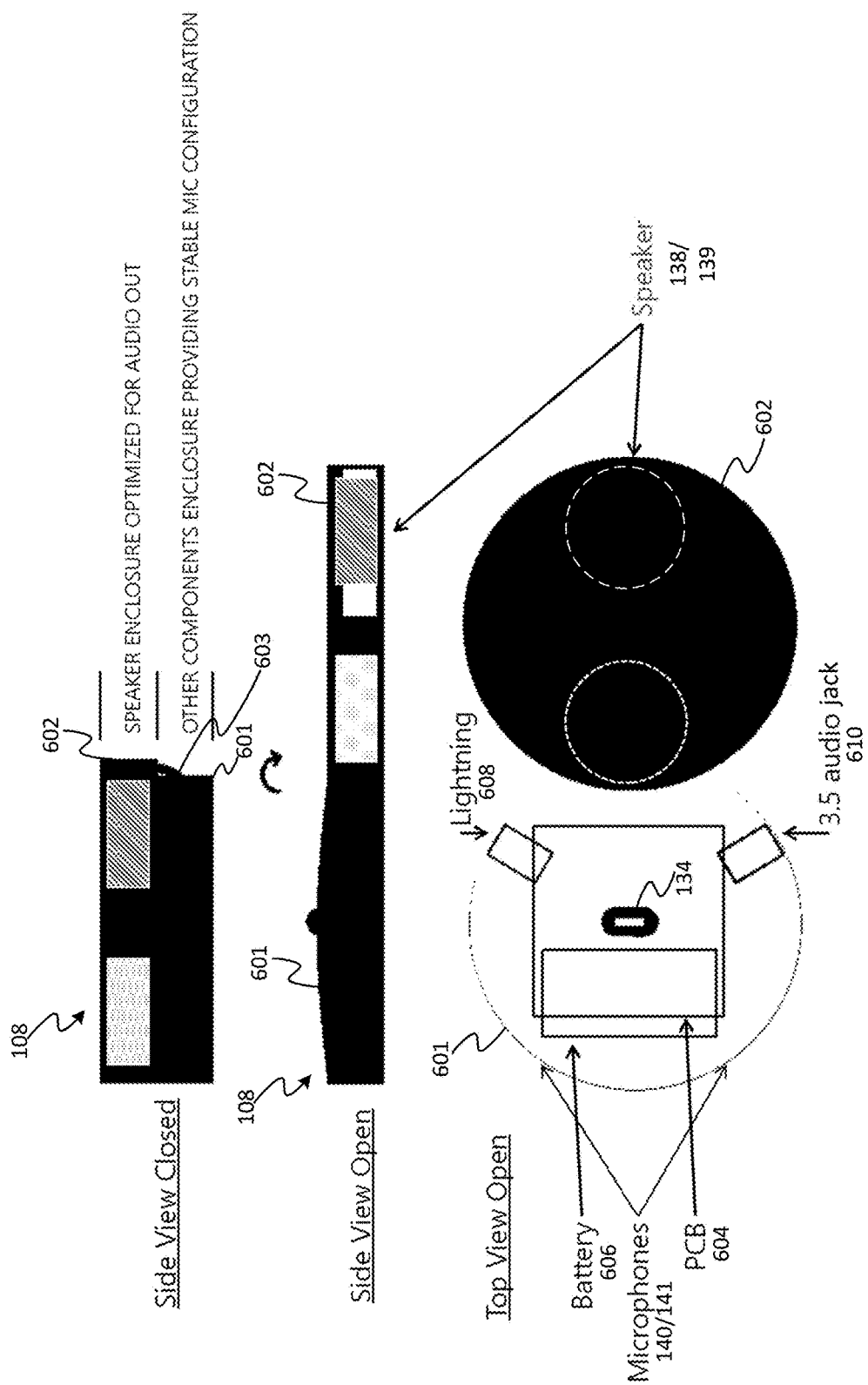

Note that as shown in FIG. 5, in embodiments the system is arranged such that the near-end user 103 can answer an incoming call from the far-end user even when it the near-end user terminal 102 is in a locked mode, e.g. even when the touchscreen 122 of the near-end user terminal 102 is locked. As will be familiar to a person skilled in the art, the operating system 110 on the user terminal 102 typically has an unlocked mode and a locked mode, wherein in the locked mode the operating system 110 will only allow the user terminal 102 to react to user inputs, e.g. via the touch screen, in specific circumstances more limited than in the unlocked mode, but not otherwise. These circumstances may include that the user 103 has entered a secret code such as a PIN or secret pattern required to return the operating system 110 back to the unlocked mode, or that an application 112, 114 on the user terminal 102 has received a push notification from an external entity (e.g. a server or another user terminal) over the network 101. The operating system 110 may be configured to automatically fall into the locked mode after a certain predetermined time period has elapsed since a user input was last received by the user terminal 102, and/or may be configured such that the user 103 can manually place it into the locked mode.

Either way, in embodiments a mechanism is put in place whereby the near-end user 103 can answer an incoming call from the far-end user 107 by actuating the actuator 136 on the peripheral device 108 despite the operating system 110 on the user terminal being in the locked state. To enable this, the operating system 110 is configured to still allow a peripheral to communicate with an application 112, 114 when the operating system 110 is in the locked state. Further, the operating system 110 is configured so as when in the locked state to still to be able to receive push notifications from a push notification service over the network 101 (e.g. the Internet), to notify a peripheral of the incoming push notification, and to allow the peripheral to wake up a certain degree of functionality of an application 112, 114 in response (e.g. to use the speaker 126 but not the screen 122).

When the communication client application (e.g. VoIP application) 112 is first installed on the user terminal 102 it registers with a push notification service provided by the server 104 of the communication service provider. Subsequently, when the far-end user 107 attempts to make a call to the near-end user 103 using the communication service (e.g. VoIP service) provided by that communication service provider, but when the operating system 110 on the near-end user's terminal 102 is in the locked state, then the push notification service on the server 104 sends a push notification to the near-end user terminal 102 via the network (e.g. Internet) 101 notifying the operating system 110 on the near-end terminal 102 that there is an incoming communication destined for the communication client application (e.g. VoIP application) 112. In response the operating system 110 notifies the control logic (e.g. embedded application) 132 of this via the interface 118, 134 between the user terminal 102 and peripheral 108. In response the peripheral 108 may output some indication of the incoming communication to the near-end user 103 (e.g. by flashing the light 608, and/or emitting a ringing sound from the speaker(s) 138/139 of the peripheral 108). Alternatively, or additionally the operating system 110 may output some notification via the speaker(s) 126 and/or screen 122 of the user terminal 102. If the user 103 then provides the input on the peripheral 108 (e.g. presses the touch sensor or push button on the base of the docking station) then the control logic 132 on the peripheral sends a signal back to the operating system 110 via the interface 134 between the peripheral 108 and the user terminal 102. The operating system 110 then allows the call to be answered and conducted using either the speaker 126 on the user terminal 102 or the speaker 138 on the peripheral 108, and either the microphone 128 on the user terminal 102 or the microphone 140/141 on the peripheral 108, but in embodiments while still keeping the screen 122 of the user terminal 102 locked.

In further embodiments, the control of the communication client application 112 by the control logic (e.g. embedded application) 132 on the peripheral 108 is performed by the control logic 132 on the peripheral invoking a URI linking to the required function within the communication client application 112 on the user terminal 102, e.g. a URI in the form of a mobile deep link.

Deep linking is the process by which hyperlinks extend from one mobile or desktop app into specific pages or screens of another for transferring information, context, and commands from one app to another that is retained across intermediate steps. While some devices can cause an application or service on another device to be launched, they generally do not deep link or provide more complex behaviour. Embodiments disclosed herein provide a method by which a control or gesture on a peripheral or accessory device 108 causes a deep link to be activated on another device 102 such as a mobile phone or a laptop. The deep link may refer to a specific page, screen, or service and provide optional contextual information about the state of the triggering device 108 or other information that may originate on the triggering device 108 or elsewhere.

A uniform resource indicator (URI) is a string of characters used to identify a resource such as an application. Thus, amongst other uses, URIs enable a first application to initiate an action by a second application. To do this, the first application invokes the URI via the operating system on which the first application is running, i.e. by indicating the URI in a request to the operating system so that in response the operating system calls upon the second application. The second application may be running on the same instance of the operating system on the same user terminal as the first application, or alternatively may be run on a remote terminal in which case the URI causes it to be contacted via a suitable network such as the Internet.

A URI comprises a left-most portion called the "scheme" which identifies the resource, in this case the application. Optionally the URI also comprises one or more further portions which qualify the action to be taken in response to the URI. An example is the "mailto" URI scheme which when invoked by, say, a web browser, calls upon an email client in order to open a new email. For instance, invoking the following URI would open a new email to a user Dave Example whose email address is dave@example.com.

mailto: dave@example.com

A URI can be associated with a particular application. When a new application is first installed on a given user terminal, it can register its URI scheme with a list of custom URI schemes recognized by the operating system on that terminal. Another application can then initiate an action by that application by invoking a URI comprising the registered URI scheme. For example, say a company called Acme runs an internet-based communication service and provides a corresponding communication client application for conducting communications such as VoIP calls and/or instance messaging (IM) via said service. Say also that this company is allocated the URI scheme "acme". When the communication client is installed it registers the URI acme with the operating system's list of custom URI schemes. Another application can then launch the communication client by invoking the following URI.

acme:

Or if Dave's username within the communication system is dave_example, the other application can then initiate a default action in relation to Dave, e.g. a voice over IP (VoIP) call, by invoking the following URI.

acme: dave_example

A mobile deep link is a URI that links to a specific function within an application, rather than simply launching an application generally. Examples would be as follows.

acme:dave_example?chat initiates an IM chat session with Dave acme:dave_example?call&video=true initiates a video call with Dave acme:dave_example?profile views Dave's profile The term "mobile deep links" refers to the use of such links in the context of one or both of the applications being a mobile applications run on a mobile terminal (whether the same mobile terminal or different ones), but a similar mechanism can also be used by applications run on one or more static terminals, or to implement interactions between mobile and static terminals.

A uniform resource locator (URL) is a URI that, as well as identifying a resource, specifies a particular means of acting in relation to it. An example of a URL scheme is http, which specifies that communications with the resource resulting from invocation of the URL shall be conducted according to Hypertext Transfer Protocol (HTTP). Another example of a URL scheme is https, which specifies that communications with the resource resulting from invocation of the URL shall be conducted according to the HTTPS (HTTP Secure) protocol. In the latter case, the application being linked to is authenticated before communications can proceed, and when they do, the communicated data is encrypted according to a cryptographic standard such as TLS (Transport Layer Security) or SSL (Secure Socket Layer).

If a first application links to a second application via a URL in the form of an HTTP or HTTPS link, an advantage of this is that it provides a web fall-back in case the second application is not available locally on the same terminal as the first application. When the URL is invoked the operating system checks whether it has the respective URL scheme in its register of custom URI schemes. If so, it calls upon the local instance of the application installed on the same terminal as the first application to perform the desired action. If not however, it either downloads an instance of the second application from the web or calls upon a web-hosted version of the second application in order to perform the action in question (optionally after prompting the user with an option to do one of these). An example would be:

https://call.acme.com/dave_example

The first application invokes this URL in order to initiate a voice call (e.g. VoIP) with Dave Example via the Acme communication service. In response the operating system checks whether the there is a locally installed instance of the Acme client. If so, the operating system launches the local acme client (or switches to it if already running in a background state) and passes it at least an indication of the requested action (in this case a call) and the target of the action (the username "dave_example"). In turn the local instance of the Acme client sends a call establishment request to the remote instance of the Acme client running on the Dave's user terminal and, if Dave accepts, proceeds to conduct the call.

If however the operating system finds, when the URL is invoked, that there is no local instance of the Acme client installed locally on the same user terminal as the first application and the operating system, then the operating system instead uses the URL to contact the Acme server to either download an instance of the Acme client (and then proceed as outlined above), or to send the call establishment request and conduct the call via a web-hosted version of the Acme client. The user may be prompted before doing this.

According to embodiments disclosed herein, when the user provides the input on the peripheral device 108, this causes the control logic 132 (e.g. embedded application) on the peripheral to invoke a URI linking to a specific function within the communication client application 112 on the user terminal 102, e.g. to answer an incoming call or to mute the near-end user 103. In embodiments the URI may comprise a URL so as to provide a web fall-back. That is, if an instance of the communication client application (e.g. VoIP application) 112 is not installed on the user terminal when the input is provided and the URL invoked, then this causes an instance of the communication client application 112 to be downloaded to and installed on the user terminal 102 from the communication service provider's server 104 via the network (e.g. Internet) 101. The call can then proceed using the newly installed client 112.

According to embodiments disclosed herein, the control logic 132 and in particular the transducer control application or audio processing application may be configured to control the at least one transducer and the at least one further transducer based on the at least one sensor 136 output. For example, in some embodiments the transducer control application or audio processing application may be configured to control the at least one transducer and at least one further transducer based on whether the at least one magnetic sensor determines that the peripheral is in an open or closed mode.

Figure 2:
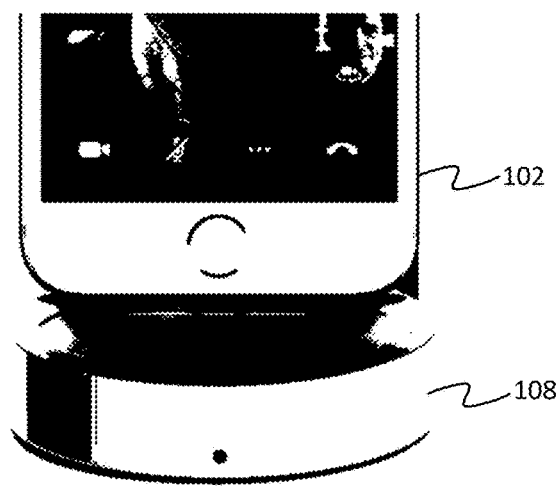
FIG. 2 shows an example design of a docking station.
Figure 4:
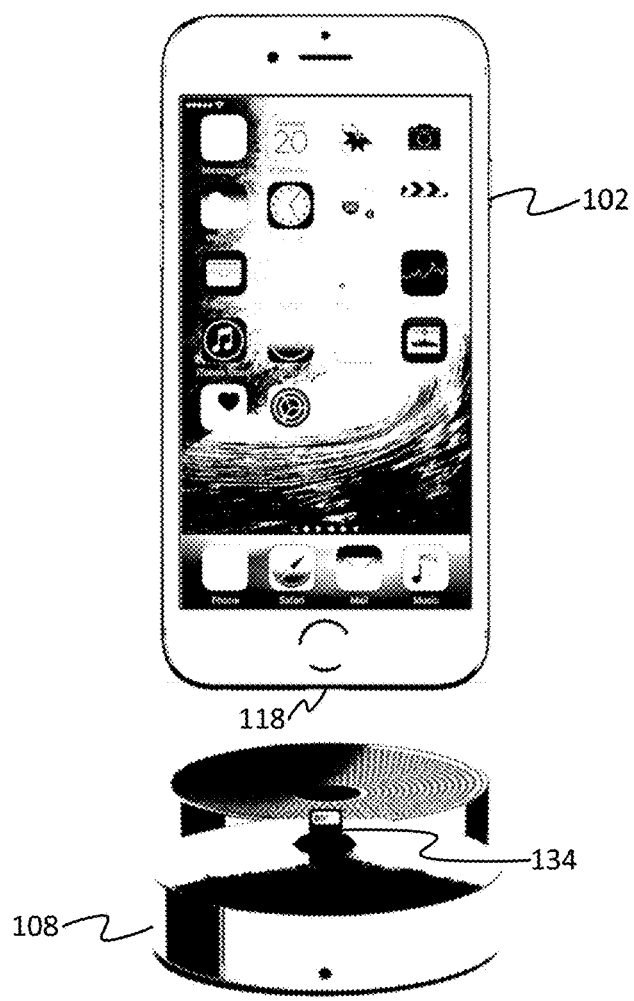
FIG. 4 shows a user terminal docking with a docking station.

The control logic 132 (transducer control application or audio processing application) may be configured to control the speaker transducer 138 oriented in one direction and further speaker transducer 139 orientated in a different or opposite direction such that the audio signal to be output by the speaker transducers is audio signal processed before being output. For example, this processing operation may be application of gains (greater than 1 to amplify the audio signal or less than 1 to diminish the audio signal) to the audio signal before outputting the audio signal such that the less obstructed or covered transducer generates the majority or all of the audio signal energy and the more obstructed or covered transducer generates a minority or no audio signal energy. In such embodiments the determination of the gain (which may be seen as being a selection or switching between transducers where the determined gains are 1 or 0) based on whether the peripheral is open or closed attempts to maintain output audio signal quality irrespective of whether the peripheral is operated in an open (such as shown in FIG. 2) or closed (such as shown in FIG. 4) mode of operation. Similarly, the control logic (the transducer control application or audio processing application) may be configured to control the output audio signal by generating frequency filters for the speaker transducers based on whether the magnetic sensor determines whether the peripheral is in an open or closed mode of operation and thus 'tune' the audio signals for the transducer before outputting the audio signal. For example, in some embodiments a speaker transducer which is orientated towards the surface on which the peripheral is placed may be configured to output more low frequency components of the audio signal to provide a bass speaker response and a speaker transducer which is orientated away from the surface may be configured to output more high frequency components to provide the treble speaker response.

In some embodiments the control logic 132 (transducer control application or audio processing application) may be configured to control captured or received audio signals from the microphone transducer 140 and further microphone transducer 141. The control may be a switching or selection between microphone transducer inputs based on the determination of whether the peripheral is operating in an open or closed mode. In some embodiments the control is a determination and application of a gain to the received/captured audio signals from the microphone transducer and further microphone transducer. The control in some embodiments is a determination and application of a frequency filter to the received/captured audio signals from the microphone transducer and further microphone transducer based on the magnetic sensor determination. Thus for example the captured audio signals from the microphone transducers may be tuned to enable a combination of the signals to remove the 'background noise' audio signals from the 'desired' audio signals. In this example the microphone capturing the 'background noise' audio signals and the microphone capturing the 'desired' audio signals is determined from the determination from the magnetic sensor of whether the peripheral is operating in an open or closed mode.

It will be appreciated that the above embodiments have been described only by way of example. Other variants may become apparent to a person skilled in the art once given the disclosure herein. The scope of the present disclosure is not limited by the described embodiments but only by the accompanying claims.

In the discussions herein, various different embodiments are described. It is to be appreciated and understood that each embodiment described herein can be used on its own or in connection with one or more embodiments described herein. Further aspects of the techniques discussed herein relate to one or more of the following embodiments.

A peripheral device for use with a user terminal, the peripheral device comprising: a first housing part and a second housing part flexibly coupled together, the peripheral configured to be operated in an open mode wherein the first housing part and the second housing part lie adjacent to each other such that the peripheral forms a stand for the user terminal and a closed mode wherein the first housing part and the second housing part lie facing each other; at least one sensor in the first housing part configured to determine whether the peripheral device is the open mode or the closed mode; at least one transducer directed in a first orientation suitable for operating in a closed mode; at least one further transducer directed in a further orientation suitable for operating in an open mode; and control logic for controlling the at least one transducer and the at least one further transducer based on the at least one sensor determining whether the peripheral device is the open mode or the closed mode.

In addition to any of the above described devices, and one or combination of: the at least one transducer is a speaker transducer directed in the first orientation, and the at least one further transducer is a further speaker transducer directed in an orientation opposite the first orientation, wherein the control logic is configured to process an audio signal to be output by the speaker transducer and/or the further speaker transducer based on the magnetic sensor determining whether the peripheral device is in the open mode or the closed mode, the control logic configured to process an audio signal is configured to: receive an audio signal to be output; determine a first gain and a further gain based on the sensor determining whether the peripheral device is in the open mode or the closed mode; apply the first gain to the audio signal and output the first gain audio signal to the speaker transducer; and apply the further gain to the audio signal and output the further gain audio signal to the further speaker transducer, the control logic configured to process an audio signal is configured to: receive an audio signal to be output; determine a first frequency filter and a further frequency filter based on the sensor determining whether the peripheral device is in the open mode or the closed mode; apply the first frequency filter to the audio signal and output the first filtered audio signal to the speaker transducer; and apply the further frequency filter to the audio signal and output the further filtered audio signal to the further speaker transducer, the at least one transducer is a microphone transducer directed in the first orientation, and the at least one further transducer is a further microphone transducer directed in an orientation opposite the first orientation, wherein the control logic is configured to process an audio signal received by the microphone transducer and/or the further microphone transducer based on the sensor determining whether the peripheral device is in the open mode or the closed mode, the control logic configured to process an audio signal is configured to: receive an audio signal from the microphone transducer and/or the further microphone transducer; determine a first gain and a further gain based on the sensor determining whether the peripheral device is in the open mode or the closed mode; apply the first gain to the audio signal received from the microphone transducer; and apply the further gain to the audio signal received from the further microphone transducer, the control logic configured to process an audio signal is configured to: receive an audio signal from the microphone transducer and/or the further microphone transducer; determine a first frequency filter and a further frequency filter based on the sensor determining whether the peripheral device is in the open mode or the closed mode; apply the first frequency filter to the audio signal received from the microphone transducer; and apply the further frequency filter to the audio signal received from the further microphone transducer, the at least one transducer directed in a first orientation is configured to be at least partially covered by the first housing part or the second housing part when the first housing part and the second housing part lie facing each other, and wherein the control logic for controlling the at least one transducer and the at least one further transducer based on the at least one sensor determining whether the peripheral device is the open mode or the closed mode is configured to: switch to the at least one further transducer when the at least one sensor determines the peripheral device is in the closed mode; and switch to the at least one transducer when the at least one sensor determines the peripheral device is in the open mode, the control logic is configured to thereby control a voice or video call that is conducted over a packet-based network from the user terminal using a communication client application, the peripheral device does not comprise any display screen, the control logic comprises embedded software and an embedded processor arranged to run the embedded software, and wherein the software is arranged to run on an embedded operating system having no presentation layer, the peripheral device takes the form of a docking station, wherein at least one of the first housing part and the second comprise a physical interface which is exposed when the peripheral is in the open mode and the peripheral forms a stand for the user terminal, the physical interface being arranged to form a connection with the user terminal when the user terminal when docked with the docking station, the at least one sensor comprises a magnetic sensor in the first housing part configured to determine the proximity of at least one magnet located in the second housing part, the at least one magnetic sensor is located on a rim of the first housing part and the at least one magnet is located on a rim of the second housing part such that the at least one magnet is located in proximity to the at least one magnetic sensor when the first housing part and the second housing part are lie adjacent to each other, the at least one magnetic sensor is located on a flat side of the first housing part and the at least one magnet is located on a flat side of the second housing part such that the at least one magnet is located in proximity to the at least one magnetic sensor when the first housing part and the second housing part are lie facing each other, one of the first housing part or second housing part comprises an electrical connector such that where the first housing part and the second housing are in the open mode, the first housing part and the second housing part form the stand and expose the electrical connector for mounting the user device, the other of the first housing part or second housing part comprises a recess such that where the first housing part and the second housing are in the closed mode, the first housing part and the second housing part are lie facing each other and the electrical connector lies within the recess and is shielded from physical damage.

A method comprising: providing a peripheral device for use with a user terminal, the peripheral device comprising: flexibly coupling a first housing part and a second housing part of the peripheral device wherein the peripheral device can be operated in an open mode wherein the first housing part and the second housing part are lie adjacent to each other such that the peripheral forms a stand for the user terminal and a closed mode wherein the first housing part and the second housing part lie facing each other; determining, using at least one sensor in the first housing part, whether the peripheral device is operating in the open mode or the closed mode; providing at least one transducer directed in a first orientation suitable for operating in a closed mode; providing at least one further transducer directed in a further orientation suitable for operating in an open mode; and controlling the at least one transducer and the at least one further transducer based on the at least one sensor determining whether the peripheral device is the open mode or the closed mode.

What is claimed is:

1. An apparatus comprising:
a first portion movably coupled to a second portion such that the first and second portions are positionable at a first relative position and a second relative position;
a transducer positioned in the first portion or the second portion;
a sensor for detecting whether the first and second portions are in the first relative position or the second relative position; and
control logic configured to control the transducer to operate differently depending on whether the first and second portions are in the first or second relative position, without turning off the transducer.

2. The apparatus of claim 1, wherein:
the transducer comprises a speaker configured to output an audio, and
the control logic is configured to:
apply a first audio filter to the audio when the first and second portions are in the first relative position, and
apply a second audio filter to the audio when the first and second portions are in the second relative position.

3. The apparatus of claim 1, wherein:
the transducer comprises a speaker configured to output an audio, and
the control logic is configured to:
apply a first gain level to the audio when the first and second portions are in the first relative position, and
apply a second gain level to the audio when the first and second portions are in the second relative position.

4. The apparatus of claim 1, wherein:
the transducer comprises a microphone configured to capture an audio, and
the control logic is configured to:
apply a first audio filter to the audio when the first and second portions are in the first relative position; and
apply a second audio filter to the audio when the first and second portions are in the second relative position.

5. The apparatus of claim 1, wherein:
the transducer comprises a microphone configured to capture an audio, and
the control logic is configured to:
apply a first gain level to the audio when the first and second portions are in the first relative position; and
apply a second gain level to the audio when the first and second portions are in the second relative position.

6. The apparatus of claim 1, wherein:
the transducer comprises a first transducer positioned in the first portion and a second transducer positioned in the second portion, and
the control logic is configured to control the first and second transducers depending on whether the first and second portions are in the first or second relative position.

7. The apparatus of claim 1, wherein:
the transducer comprises a first speaker positioned in the first portion and a second speaker positioned in the second portion, and
the control logic is configured to control the first and second speakers to operate differently depending on whether the first and second portions are in the first or second relative position.

8. The apparatus of claim 1, wherein:
the transducer comprises a first microphone positioned in the first portion and a second microphone positioned in the second portion, and
the control logic is configured to control the first and second microphones to operate differently depending on whether the first and second portions are in the first or second relative position.

9. A method for operating an apparatus comprising first and second portions movably coupled to each other such that the first and second portions are positionable at a first relative position and a second relative position, the method comprising:
determining whether the first and second portions are in the first or second relative position; and
controlling a transducer of the apparatus to operate differently depending on whether the first and second portions are in the first or second relative position, without turning off the transducer.

10. The method of claim 9, wherein:
the transducer comprises a speaker configured to output an audio, and
controlling the transducer comprises:
applying a first audio filter to the audio when the first and second portions are in the first relative position; and
applying a second audio filter to the audio when the first and second portions are in the second relative position.

11. The method of claim 9, wherein:
the transducer comprises a speaker configured to output an audio, and
controlling the transducer comprises:
applying a first gain level to the audio when the first and second portions are in the first relative position; and
applying a second gain level to the audio when the first and second portions are in the second relative position.

12. The method of claim 9, wherein:
the transducer comprises a microphone configured to capture an audio, and
controlling the transducer comprises:
applying a first audio filter to the audio when the first and second portions are in the first relative position; and
applying a second audio filter to the audio when the first and second portions are in the second relative position.

13. The method of claim 9, wherein:
the transducer comprises a microphone configured to capture an audio, and
controlling the transducer comprises:
applying a first gain level to the audio when the first and second portions are in the first relative position; and
applying a second gain level to the audio when the first and second portions are in the second relative position.

14. The method of claim 9, wherein:
the apparatus comprises a first transducer positioned in the first portion and a second transducer positioned in the second portion, and
controlling the transducer comprises controlling the first and second transducers to operate differently depending on whether the first and second portions are in the first or second relative position.

15. An apparatus system comprising:
first and second portions movably coupled to each other so as to be positionable at a first relative position and a second relative position;
a sensor configured to determine whether the first and second portions are in the first or second relative position;
a transducer positioned in one of the first and second portions;
a processor; and
a memory in communication with the processor, the memory comprising executable instructions that, when executed by the processor, cause the processor to perform functions of:
 determining, using the sensor, whether the first and second portions are in the first or second relative position; and
 controlling the transducer to operate differently depending on whether the first and second portions are in the first or second relative position, without turning off the transducer.

16. The apparatus of claim 15, wherein:
the transducer comprises a speaker configured to output an audio, and
to control the transducer, the instructions further include instructions that, when executed by the processor, cause the processor to perform functions of:
 applying a first audio filter to the audio when the first and second portions are in the first relative position; and
 applying a second audio filter to the audio when the first and second portions are in the second relative position.

17. The apparatus of claim 15, wherein:
the transducer comprises a speaker configured to output an audio, and
to control the transducer, the instructions further include instructions that, when executed by the processor, cause the processor to perform functions of:
 applying a first gain level to the audio when the first and second portions are in the first relative position; and
 applying a second gain level to the audio when the first and second portions are in the second relative position.

18. The apparatus of claim 15, wherein:
the transducer comprises a microphone configured to capture an audio, and
to control the transducer, the instructions further include instructions that, when executed by the processor, cause the processor to perform functions of:
 applying a first audio filter to the audio when the first and second portions are in the first relative position; and
 applying a second audio filter to the audio when the first and second portions are in the second relative position.

19. The apparatus of claim 15, wherein:
the transducer comprises a microphone configured to capture an audio, and
to control the transducer, the instructions further include instructions that, when executed by the processor, cause the processor to perform functions of:
 applying a first gain level to the audio when the first and second portions are in the first relative position; and
 applying a second gain level to the audio when the first and second portions are in the second relative position.

20. The apparatus of claim 15, wherein:
the transducer comprises a first transducer positioned in the first portion and a second transducer position in the second portion, and
to control the transducer, the instructions further include instructions that, when executed by the processor, cause the processor to perform a functions of controlling the first and second transducers to operate differently depending on whether the first and second portions are in the first or second relative position.

21. An apparatus comprising:
a first portion movably coupled to a second portion such that the first portion and the second portion are positionable at a first relative position and a second, different relative position relative to each other;
a transducer positioned in one of the first portion or the second portion;
at least one sensor for detecting whether the first portion and the second portion are in the first relative position or the second relative position; and
control logic configured to control the transducer differently based on whether the at least one sensor indicates that the first portion and the second portion are in the first relative position or the second relative position, wherein:
the transducer comprises a speaker, and
the control logic is configured to control the speaker by applying different audio filters or gain levels to audio for output from the speaker based on whether the at least one sensor indicates that the first portion and the second portion are in the first relative position or the second relative position.

* * * * *